United States Patent
Reinosa et al.

(10) Patent No.: US 9,287,761 B2
(45) Date of Patent: Mar. 15, 2016

(54) SYSTEM AND APPARATUS FOR MAGNETIC MULTIPLICATION OF TORQUE AND ROTATIONAL MOVEMENT

(71) Applicants: R. Walter Reinosa, San Salvador (SV);
J. Roberto Delgado, La Libertad (SV);
Stephen M. Sutton, San Salvador (SV)

(72) Inventors: R. Walter Reinosa, San Salvador (SV);
J. Roberto Delgado, La Libertad (SV);
Stephen M. Sutton, San Salvador (SV)

( * ) Notice: Subject to any disclaimer, the term of this patent is extended or adjusted under 35 U.S.C. 154(b) by 0 days.

(21) Appl. No.: 14/737,918

(22) Filed: Jun. 12, 2015

(65) Prior Publication Data

US 2015/0364981 A1  Dec. 17, 2015

Related U.S. Application Data

(60) Provisional application No. 61/998,009, filed on Jun. 16, 2014.

(51) Int. Cl.
*H02K 7/10*  (2006.01)
*H02K 49/10*  (2006.01)

(52) U.S. Cl.
CPC .................... *H02K 49/102* (2013.01)

(58) Field of Classification Search
CPC ........... H02K 7/10; H02K 7/106; H02K 7/11; H02K 7/116
USPC ....... 310/101, 102 R, 103, 98, 99, 51, 80, 91, 310/90.5
See application file for complete search history.

(56) References Cited

U.S. PATENT DOCUMENTS

| | | | |
|---|---|---|---|
| 3,253,170 A * | 5/1966 | Phillips et al. ................ | 310/168 |
| 5,562,347 A | 10/1996 | Hsieh | |
| 5,942,825 A | 8/1999 | Lee | |
| 5,994,814 A * | 11/1999 | Kawabata et al. ..... | 310/216.062 |
| 6,411,001 B1 * | 6/2002 | Henderson ........... | H02K 49/102 310/101 |
| 6,710,489 B1 * | 3/2004 | Gabrys ........................ | 310/90.5 |
| 2005/0211526 A1 * | 9/2005 | Averill et al. ................ | 192/48.3 |
| 2006/0123936 A1 | 6/2006 | French | |
| 2007/0262665 A1 * | 11/2007 | Park .............................. | 310/103 |
| 2009/0195098 A1 * | 8/2009 | Usami et al. .................... | 310/78 |
| 2012/0025534 A1 * | 2/2012 | Miyamoto et al. ........ | 310/156.54 |
| 2013/0127279 A1 | 5/2013 | Jang | |

FOREIGN PATENT DOCUMENTS

WO  2008-106705 A2  9/2008

OTHER PUBLICATIONS

Notification of Transmittal of the International Search Report and the Written Opinion of the International Searching Authority dated Dec. 7, 2015, in connection with corresponding International Application No. PCT/IB2015/001632 (14 pgs.).

* cited by examiner

*Primary Examiner* — Michael Andrews
(74) *Attorney, Agent, or Firm* — Maier & Maier, PLLC (57) ABSTRACT

According to an exemplary embodiment, a rotational movement multiplier apparatus may be described. The rotational movement multiplier may be formed of at least one of a support structure, a lower platform, a support platform, and an upper platform that may be rigidly connected to the support structure. A driver disc may be rigidly connected to a driver shaft and a coupler may connect the driver shaft to a motor. Two or more rotor discs may be rigidly connected to a corresponding rotor shaft that may be rotatably connected with bearings to the support structure, and a first plurality of magnets may be rigidly connected to the driver disc and a second plurality of magnets may be rigidly connected to the rotor disc. Finally, the driver disc may be magnetically coupled to the rotor disc and may transmit rotational movement to the rotor disc without loss of torque or rotational speed.

17 Claims, 8 Drawing Sheets

SYSTEM AND APPARATUS FOR MAGNETIC MULTIPLICATION OF TORQUE AND ROTATIONAL MOVEMENT

PRIORITY CLAIM

This application claims priority to U.S. Provisional Application No. 61/998,009, filed Jun. 16, 2014, the contents of which are herein incorporated by reference in their entirety.

BACKGROUND

Magnetic coupling devices are able to transmit torque between a driver and a rotor by exploiting magnetic fields between the members. The transmission of torque without direct physical contact makes these devices extremely desirable in a wide variety of applications, such as specialty pumps and marine motors. Another advantage of magnetic coupling is the reduction of friction forces associated with mechanical gears. Magnetic couplings commonly involve permanent magnets arranged in a linear or circular array with an alternating pattern of south-pole and north-pole faces. The arrays can be arranged in a face-to-face relationship in an axial direction or concentrically with the individual pole faces of the opposed arrays facing each other in a radial direction to the axis of rotation of the arrays. A driver is modified to be linked to a motor or other driving means while a group of rotors is adapted to be magnetically coupled to the driver. When the arrays are at rest, the opposed north and south pole faces of the coupled arrays align with each other due to the attractive force of the facing magnet and the repulsive forces of the adjacent pole faces. When a rotary drive force is applied to the driver, the rotor is caused to rotate in synchronism due to the attractive and repulsive magnetic forces.

SUMMARY

According to an exemplary embodiment, a rotational movement multiplier may be described. The rotational movement multiplier may be formed of at least one of a support structure, a lower platform, an upper platform, and a support platform that may be rigidly connected to the support structure. Additionally, one or more bushings or such devices may be connected to the lower end of the support structure. A driver disc may be rigidly connected to a driver shaft and a coupler may connect the driver shaft to a motor. Two or more rotor discs may be rigidly connected to a corresponding rotor shaft that may be rotatably connected to the support structure. Additionally, a first group of magnets may be rigidly connected to the driver disc and a second group of magnets may be rigidly connected to the rotor disc. In addition, the rotor shafts may further levitate magnetically due to a number of magnets rigidly connected to the lower end of the two or more rotor shafts that may interact with a number of magnets rigidly connected to the support platform. Also, the driver disc may be magnetically coupled to the two or more rotor discs and may transmit rotational movement without loss of torque or rotational speed.

In another exemplary embodiment, a system for multiplying rotational movement may be shown and described. The system for multiplying rotational movement may include at least one of a motor, an external power source, and a rotational movement multiplier apparatus. The rotational movement multiplier apparatus may be formed of at least one of a support structure, a lower platform, and an upper platform that may be rigidly connected to the support structure. Additionally, one or more bushings or such devices may be connected to the lower end of the support structure. A driver disc may be rigidly connected to a driver shaft and a coupler may connect the driver shaft to an electric motor. Further, the driver disc may be magnetically coupled to the two or more rotor discs and may transmit rotational movement without loss of torque or rotational speed.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
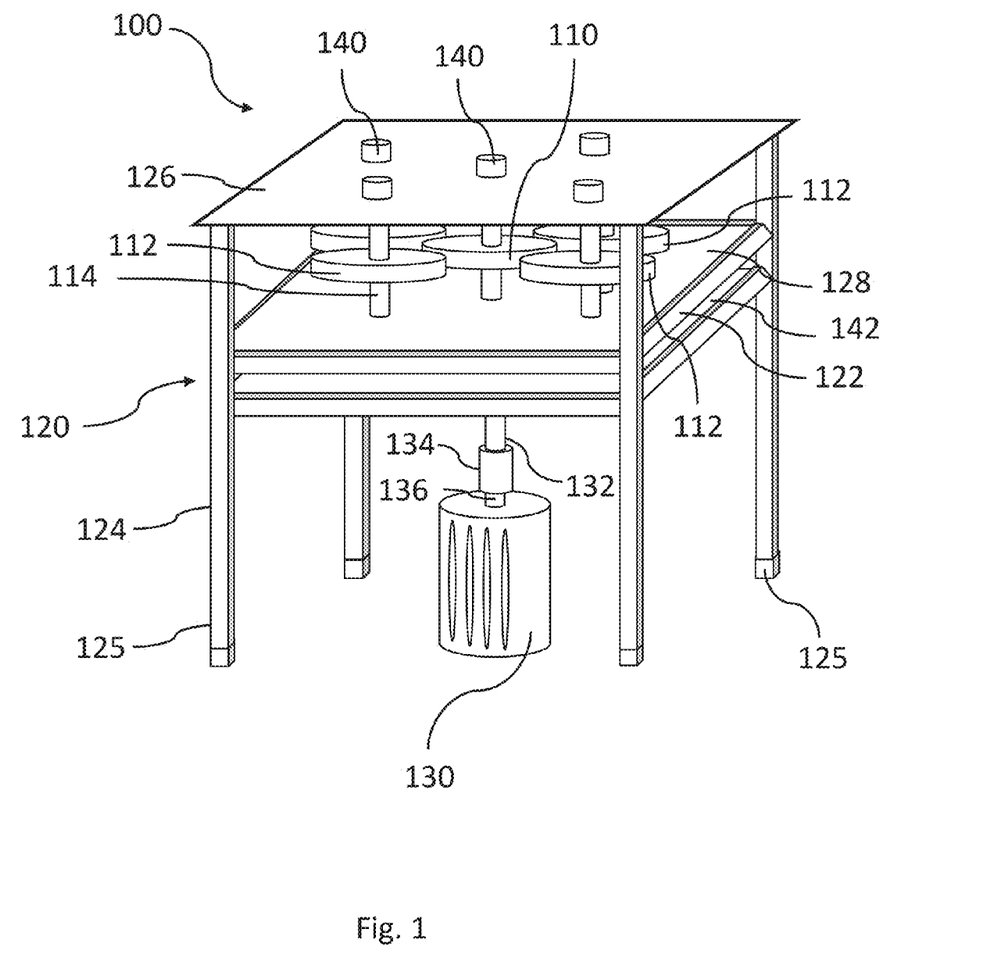
FIG. 1 is a diagram showing an exemplary embodiment of a rotational movement multiplier with shafts in vertical positions.

An exemplary embodiment of a rotational movement multiplier may be described in FIG. 1. A rotational movement multiplier 100 may include a support structure 120 formed of a number of vertical elements 124 rigidly attached to a number of horizontal elements 122 that may support a lower platform 128, an upper platform 126 and a support platform 142. A driver disc 110 may be rigidly connected to a driver shaft 132. Further, the driver shaft 132 may have a length of about 35.0 cm, a diameter of about 2.54 cm, and may be made of machined stainless steel or any other desired materials. It may further be appreciated that the driver shaft 132 may have any other desired dimensions. Rotatory movement may be supplied to the rotational movement multiplier by a motor 130 rotatably connected to a motor shaft 136. The rotational movement may be provided by an electric motor or any other motor or device capable of providing rotational movement, including but not limited to electric motors, fossil fuel combustion motors, geothermal power, and hydropower, or any combination thereof. A number of bearings 140 may facilitate the rotatory movement of the diver shaft 132 and rotor shafts 114. It may be appreciated that the bearings 140 may be mechanical bearings or magnetic bearings, as desired. It may further be appreciated that the number of bearings 140 may be connected to at least one of the lower platform 128, the upper platform 126 and the support platform 142. At a lower end of the driver shaft 132 may be a coupler 134 utilized for the attachment to the shaft 136 of the electric motor 130 and which may maintain a desired or proper alignment between the driver shaft 132 and the motor shaft 136. It may be appreciated that the coupler may be a cardanic coupler, universal joint, double cardanic coupler, or other type of coupling device, as desired. A number of rotor discs 112 may be rigidly connected to rotor shafts 114. The rotor shafts 114 may have a length of about 25.0 cm, an inner diameter of about 2.54 cm, and may be made of machined stainless steel or any other desired material or combination of materials. However, it may further be appreciated that the rotor shafts 114 may have any other desired dimensions. For example, rotor shafts 114, along with other components used herein, may be formed in larger or smaller sizes, depending on a desired use or application. The rotor shafts 114 may be rotatably connected to the support structure 120. Additional rotor discs 112 and rotor shafts 114 may be added to further expand the structure in other exemplary embodiments. Further, it is envisioned that the rotational movement multiplier and any of its individual components may be scaled up to be utilized with electric motors at the megawatts and gigawatts scale, for example, in grid-connected power plants. Similarly, the elements may also be scaled down to fit in small devices such as drones and micro devices such as cardiac pumps, or devices of any desired size.

According to another exemplary embodiment, a set of rotor discs 112 may be placed at a 90 degree angle relative to the driver disc 110 over the lower platform 128, over the support platform 142, and below the upper platform 126. In further exemplary embodiments, the lower platform 128, the support platform 142, and the upper platform 126 may be square, or any other desired shape. The lower platform 128, the support platform 142, and the upper platform 126 may further be made of aluminum, or any other desired material or combination of materials, and may have a thickness of about 19.0 mm, with each side measuring about 51.0 cm in length. However, it may further be appreciated that the lower platform 128, the support platform 142, and the upper platform 126 may have any other desired dimensions. Further, the lower platform 128, the support platform 142, and the upper platform 126 may be separated from each other by about 15 cm. The upper platform 126, and the lower platform 128 may contain ball-bearing units or magnetic bearing units which may be utilized to maintain the stability and alignment of each rotating shaft. A synthetic rubber or polyurethane mounting (bushing) 125 may be connected to the lower end of the vertical elements 124. Synthetic rubber or polyurethane mounting (bushing) 125 may be used to mitigate, manage, reduce, or eliminate vibration, as desired. The bushings 125 may be any other vibration reducing device in other exemplary embodiments. Further, the rotor shafts 114 may be attached to an electrical generator to produce and/or store electrical power, or to any desired device, such as means of vehicular propulsion, dynamos, and machinery.

Figure 2A:
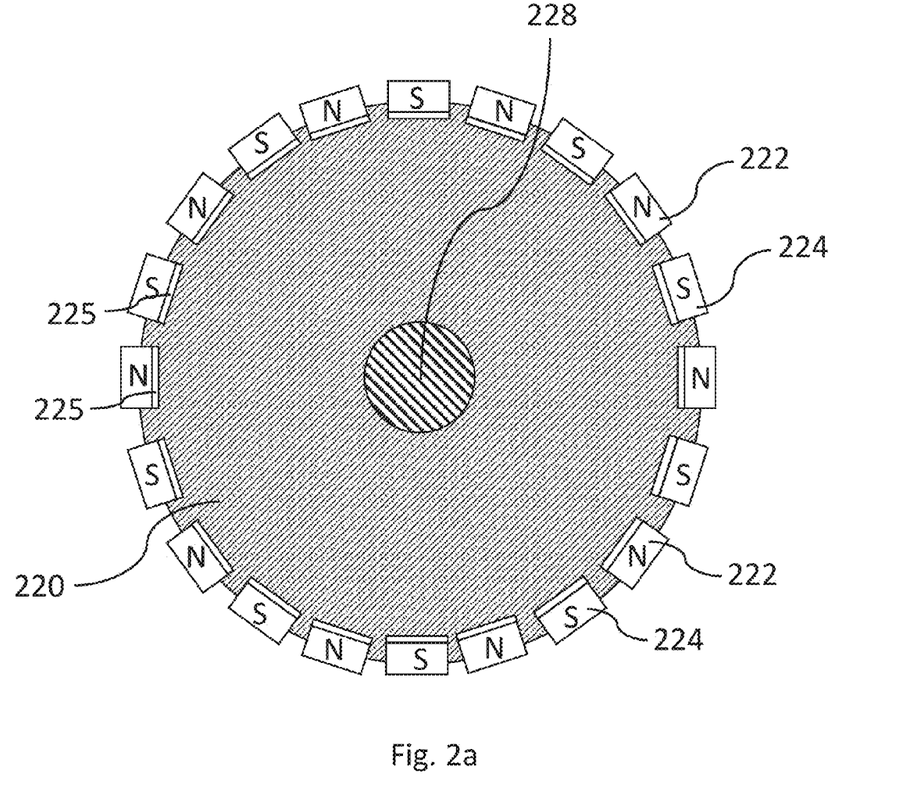
FIG. 2a is a diagram showing an exemplary embodiment of a magnetic disc.
Figure 2B:
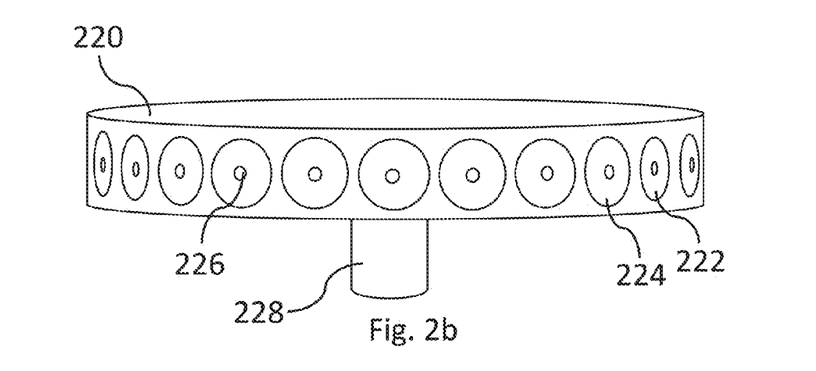
FIG. 2b is a perspective view of a magnetic disc.

In an additional exemplary embodiment illustrated in FIGS. 2a and 2b, the driver disc 110 and rotor disc 112 may have similar constructions, and may be reflected in FIGS. 2a and 2b as disc 220. The disc 220 may be rigidly coupled to a shaft 228 (similar to drive shaft 132 or rotor shaft 114) made of aluminum or any other desired material or combination of materials. The disc 220 may have a diameter of about 20 cm, and may have a thickness of about 3.81 cm. However, it is envisioned that the diameter and thickness of the disc 220 may be scaled up or scaled down to be adapted to any particular or desired purpose. The discs 220 (as used throughout the device described herein) may also contain any number of cavities drilled in their perimeters. The cavities may be formed and made in a uniform fashion, for example having the same or similar widths and depths. Alternatively, the cavities may be formed so that alternating cavities have alternating dimensions, for example alternating depths. Additionally, the cavities may be uniformly or substantially uniformly spaced about the perimeter of disc 220 or discs 220. For example, the cavities may have a diameter of about 2.54 cm, a depth of about 1.27 cm and the discs 220 may be drilled with about 20 cavities. It may further be appreciated that the discs 220 may be drilled with any other number of cavities and may have any other desired dimensions. It is envisioned that the number and sizes of the cavities may be scaled up or scaled down to be adapted to any particular or desired purpose. Beyond the drill depth of the cavities may be a threaded hole that may receive the steel screws 226. Each disc 220 may be adapted with any number of north-oriented magnets 222 and any number of south-oriented magnet 224. In an exemplary embodiment, neodymium magnet or any other type of permanent magnet may be used for this purpose. In an exemplary embodiment, the north-oriented magnets 222 and the south-oriented magnet 224 may be drilled with double countersink, may have a diameter of about 2.54 cm, and a height of about 1.27 cm. In a further example, the distance between the north-oriented magnets 222 and the south-oriented magnet 224 may be about 10 mm. It may be appreciated that the north-oriented magnets 222 and the south-oriented magnets 224 may have any other dimensions, as desired. For example, magnets 222 and 224 may be sized to correspond with cavities on disc 220 having different sizes. It is envisioned that the characteristics and the size of the magnets 222, 224 be scaled up or scaled down to be adapted to any particular or desired purpose. The north-oriented magnets 222 and the south-oriented magnet 224 may further be seated in the cavities on the face of the disc in an arrangement such that their magnetic fields orientation may be presented in an alternating pattern, for example north, south, north, south, etc., about the perimeter of disc 220.

In a further exemplary embodiment, a number of washers 255 may be inserted in the cavity before the north-oriented magnets 222 and the south-oriented magnet 224. Washers 225 may have a thickness of about 0.30 cm to about 0.35 cm and an external diameter of about 2.54 cm. It may be further appreciated that the washers 225 may have any other dimensions, for example dimensions that substantially reflect the dimensions of the cavities on disc 220 or magnets 222, 224. It is envisioned that the thickness of the washers 225 may be scaled up or scaled down to be adapted to any particular or desired purpose. Additionally, the washers 225 may yield increased magnetic fields and may aid in extending the magnets 222, 224 beyond the face of the disc 220. Each magnet 222, 224 may be secured to a face of disc 220. In an exemplary embodiment, stainless steel screws 226 may have a length of about 3.81 cm, a diameter of about 10.0 mm, and may be tightened with a torque of about 10 psi. However, it may further be appreciated that the stainless steel screws 226 may have any other desired dimensions. It is envisioned that the size of the stainless screws 226 may be scaled up or scaled down to be adapted to any particular or desired purpose. In an exemplary embodiment, the north-oriented magnets 222 may rest on three washers 225 in the cavities and the south-oriented magnets 224 may rest on two washers 225 in the cavities. In a further exemplary embodiment, washers 225 placed in the north-oriented magnet 222 cavities may have a thickness of about 3 mm and washers 225 placed in the south-oriented magnet 224 cavities may have thickness of about 3.5 mm. It may be appreciated that any number and thickness of washer may be used, as desired. It is envisioned that the thickness of the washers 225 may be scaled up or scaled down to be adapted to any particular or desired purpose. Additionally, varying numbers and thicknesses of washers 225 may be used in different exemplary embodiments to provide different qualities, as desired. For example, the depth of magnets 222, 224 in the cavities on disc 220 may be varied by using different washers 225 with respect to north-oriented magnet 222 and south-oriented magnet 224. The different washers 225 can include different numbers of washers and/or washers having varying dimensions.

In a further exemplary embodiment, cyanoacrylate superglue combined with sodium bicarbonate may also be used to bond, or further bond, the magnets 222, 224 to the disc 220, as desired. Once each disc 220 attached to the driver shaft 132 or the rotor shafts 114, as desired, the north-oriented magnets 222 and the south-oriented magnet 224 may be seated in the respective cavities and bonded.

Figure 3:
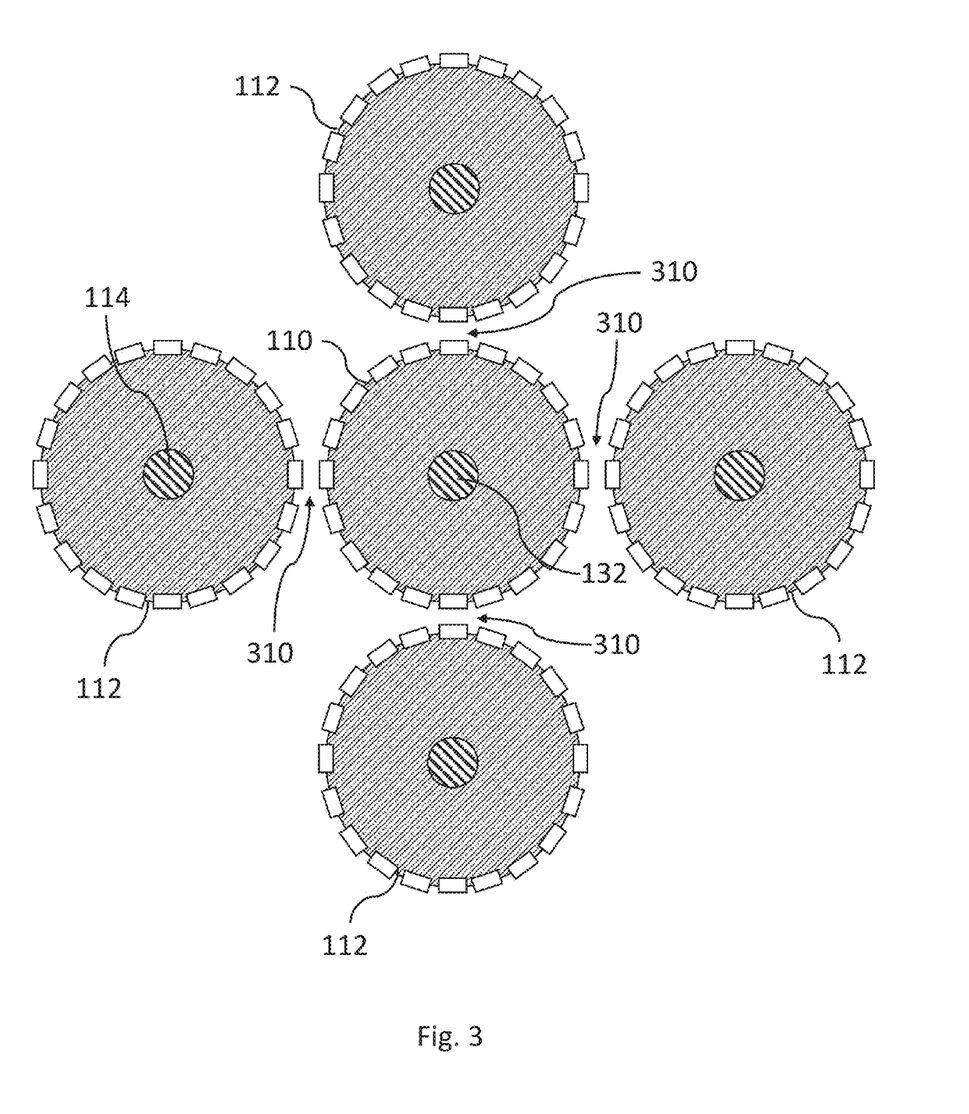
FIG. 3 is a diagram showing an exemplary embodiment of a driver disc and an array of rotor discs.

Exemplary FIG. 3 may illustrate a further embodiment where the driver disc 110 may be positioned at a center of the lower platform 128 and the upper platform 126. The on-center distances from the driver disc 110 to each rotor disc 112 may be about 22.3 cm resulting in a distance of about 23 mm between the driver disc 110 perimeter and each rotor disc 112. It may be appreciated that the driver disc 110 may be at any other distance to each rotor disc 112. Furthermore, the distance 310 between each north-oriented magnet 222 and the facing south-oriented magnet 224 may be about 7 mm or any other desired distance, for example depending on the relative size of other components. This distance may be chosen, in some exemplary embodiments, specifically to yield a desired or best effect for the transference of speed and force imposed by the driver shaft 132 which may be rotated by the motor 130. This transference may occur without loss of force (torque) and speed (RPM) from the driver shaft 132 to each rotor shafts 114 and thereby may multiply the original rotational movement of the driver shaft 132 without the need for more energy being consumed by the motor 130.

Figure 4:
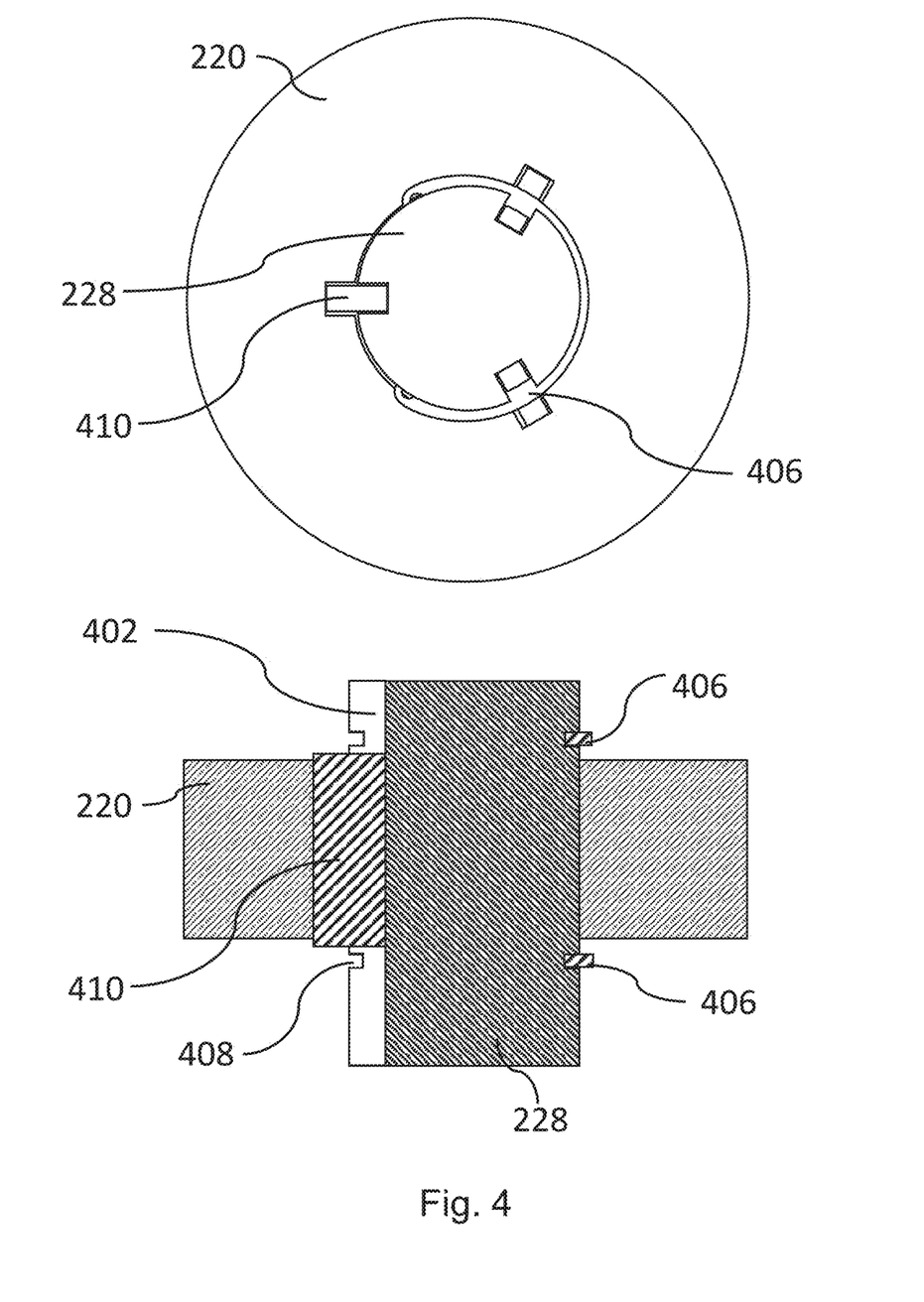
FIG. 4 is a diagram showing an exemplary embodiment of a spline inserted in a disc and secured by at any number of C-clips.

In another exemplary embodiment shown in FIG. 4, a number of spline grooves 402 may be machined into each shaft 228 and into each disk 220 and may be utilized in conjunction with a spline 410 to rigidly connect the disc 220 in place to the shaft 228. Spline grooves 402 may have a depth of about 6 mm, a width of about 5 mm, and a length of about 3.81 cm. However, it may further be appreciated that the spline groove 402 may have any other desired dimensions based on dimensions of shaft 228 and disc 220. It is envisioned that the width and depth of the spline groove 402 grooves may be scaled up or scaled down to be adapted to any particular or desired purpose. A number of C-clips 406 may be attached to the spline groove 408, secured in a number of circumference grooves 408 and may be utilized to hold the disc 220 in place. The circumference spline groove 408 may have a depth of about 3 mm and a width of about 4 mm. However, it may further be appreciated that the circumference groove 408 may have any other desired dimensions based on dimensions of the shaft 228. The C-clip 406 may be made of steel or any other desired material or combination of materials. The C-clip 406 may also have a diameter of about 2.54 cm. The C-clip 406 may have any other desired dimensions according to the diameter of the spline 403. The C-clip may be positioned at distal ends of the spline groove 402. Furthermore, the spline 403 may be made of stainless steel or any other desired material or combination of materials and may have a length of about 3.81 cm, a width of about 10 mm, and a thickness of about 5 mm. The spline 403 may have any other desired dimensions, for example, depending on application.

Figure 5:
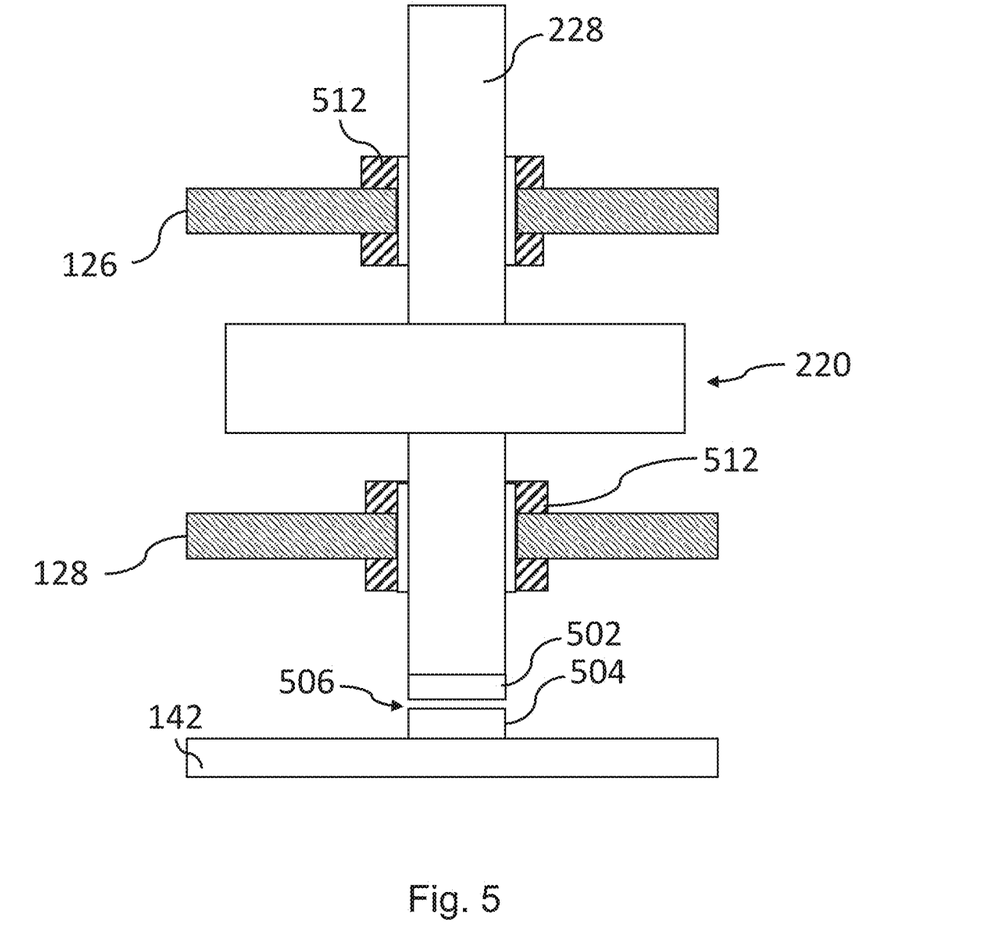
FIG. 5 is a diagram showing an exemplary embodiment of bearing system and magnetic levitation system for a rotor shaft.

Another exemplary embodiment may be illustrated in FIG. 5. At a lower end of each rotor shaft 228, a magnet 502 similar to those attached to the discs 220 may be attached in the same, or a similar, manner as those secured to the disc 220. The magnet 502 may interact with another magnet 504 positioned on the support platform 142 and may cause the shaft to levitate as a result of opposing the gravitational forces. A gap 506 may be created between magnet 502 and the magnet 504. The rotatory movement of the shaft may be facilitated by the bearings 512 that may be located on the upper platform 126 and lower platform 128. It may be appreciated that the bearings may be ball-bearing, magnetic bearing or any type of bearings desired. Additionally, it may be appreciated that the gap 506 may have a substantially static or variable height depending on the orientation and placement of magnets 502, 504 and a distance there between.

In an exemplary embodiment, the motor 139 may be an electric motor and may have any of a variety of characteristics. For example, the motor 139 may have a single phase current of about 220-240 volts, may provide about 3,580 revolutions per minute (RPMs), and may have about 7 horsepower (hp). It may further be appreciated that the motor 139 may have any other desired general characteristics, properties, inputs, and/or outputs. The motor 139 may also be secured to the support structure 120 with welded supports, or the like, as desired.

Thus, in an exemplary embodiment, a motor 139, for example, an electric motor, may cause the driver disc 110 and its driver shaft 132 to rotate. This, in turn, may cause an angular acceleration to be exerted on north-oriented magnets 222 and the south-oriented magnets 224 connected to the driver disc 110. The angular acceleration may then be imparted to the rotor discs 112 through magnetic coupling of its south-oriented magnets 224 and the north-oriented magnets 222. Consequently, the acceleration and torque from the driver disc 110 may be forced on the rotor discs 112, and may cause the rotor discs 112 and rotor shaft 114 to rotate at the same magnitude as that originally imposed on the driver disc 110 and driver shaft 132 by the motor 139. The effect of the interaction resulting between a north magnetic field from the driver disc 110 and a south magnetic field from the rotor disc 112 may also affect the south magnetic field of the driver disc 110 and north magnetic field of the rotor discs 112 in substantially the same manner. Due to the effect of rotational movement multiplication, each rotor disc/shaft may thus acquire the same characteristics that may be forced by the motor 139 on the driver disc 110 and driver shaft 114 assembly. As a result, in other exemplary embodiments, additional rotors may be added to one driver/motor unit and those rotors may achieve an equivalent mechanical output without the need for more motors (for each additional rotor).

Figure 6:
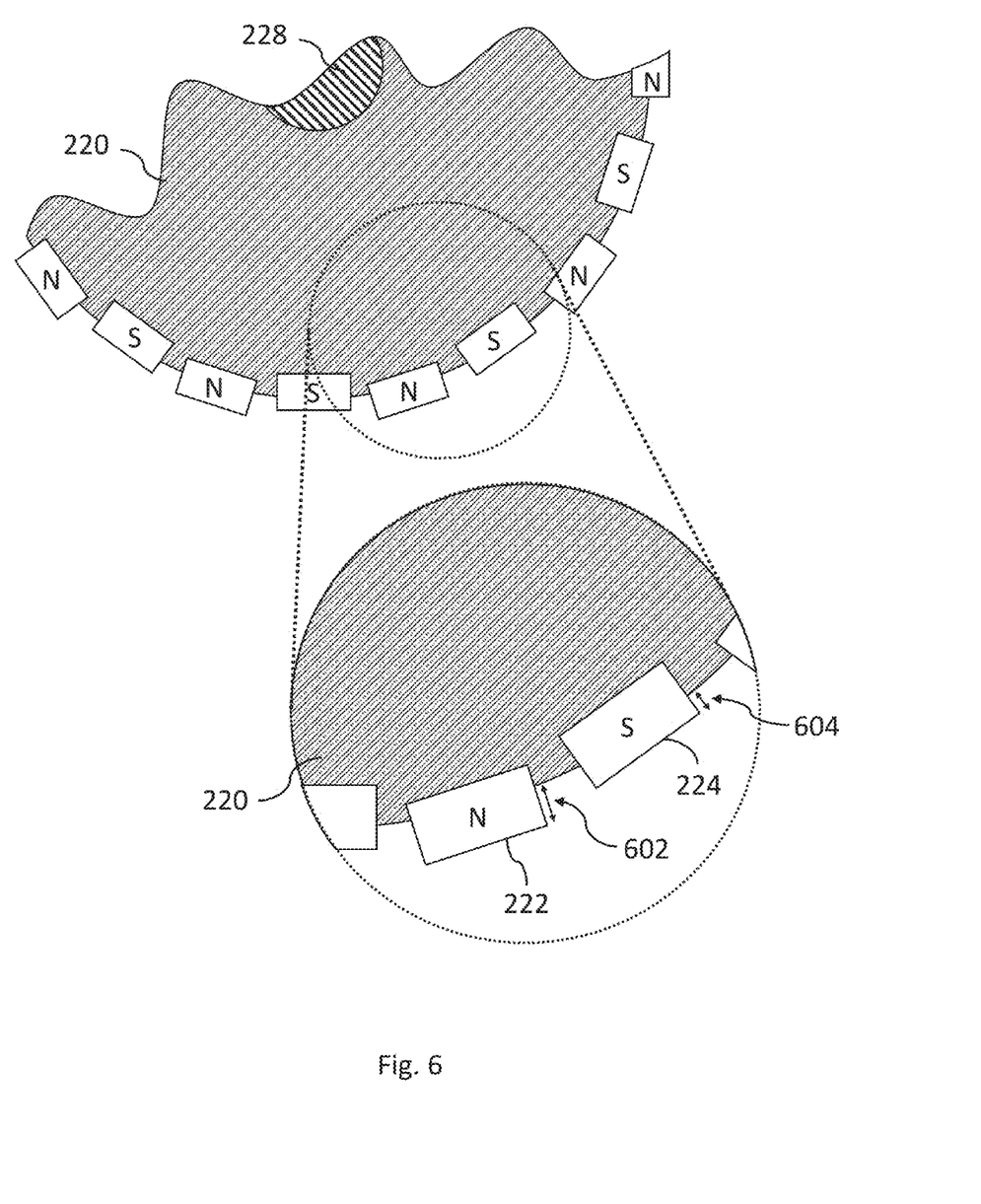
FIG. 6 is a diagram showing an exemplary embodiment of magnets position with respect to the perimeter of a disc.

In an exemplary embodiment illustrated in FIG. 6, each magnet 222, 224 may protrude beyond the face of the disc 220 in the following manner: those magnets that may present a north polarity 222 may extend 9.0 mm beyond the perimeter of the disc 602 while those magnets that may present a south polarity 224 may extend about 7.0 mm beyond the face of the disc 604. However, it may be appreciated that the distance between the face of the magnets 222, 224 and the perimeter of the disc 220 may be of any desired value, determined, for example, by the strength of a magnetic field of the magnets utilized It is envisioned that the size and number of magnets may be scaled up or scaled down to be adapted to any particular or desired purpose.

Figure 7A:
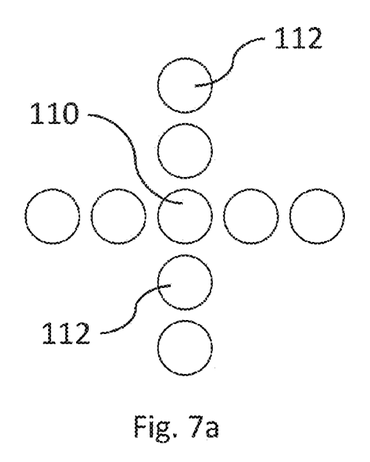
FIG. 7a is a diagram showing an exemplary embodiment of an array of eight rotor discs.
Figure 7B:
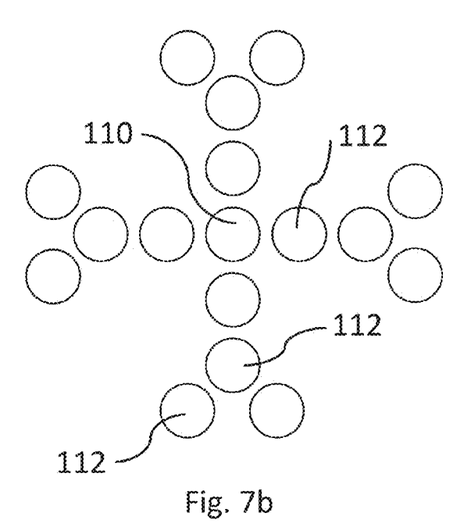
FIG. 7b is a diagram showing an exemplary embodiment of an array of sixteen rotor discs.
Figure 7C:
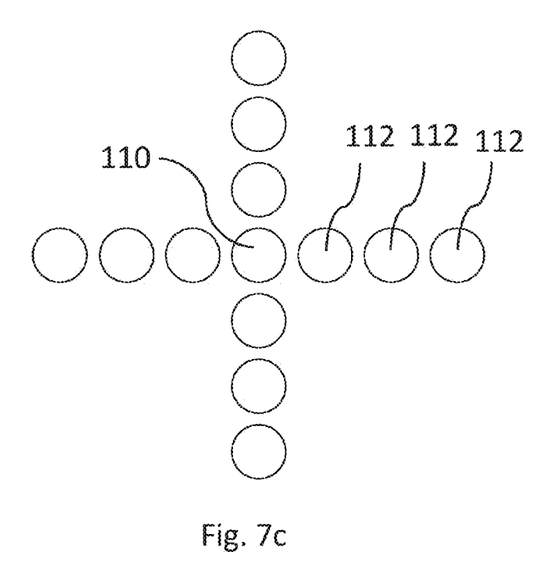
FIG. 7c is a diagram showing an exemplary embodiment of an array of twelve rotor discs.

In an exemplary embodiment, four rotors discs 112 may be may be associated with one driver disc 110 (shown in exemplary FIG. 3). Additionally, it may be appreciated that any number or rotor discs 112 or array geometries may be utilized in the exemplary embodiments described herein. In an exemplary embodiment shown in FIG. 7a-7c, the configuration in FIG. 3 may be amplified so that there may be eight rotor discs 112 as illustrated in FIG. 7a, 16 rotor discs 112 as illustrated in FIG. 7b, or 12 rotor discs 112, as illustrated in FIG. 7c, and at least one driver disc 110. It may further be appreciated that any additional number of rotors discs 112 may be oriented to provide a multiplied effect.

In an additionally exemplary embodiment, the driver shaft 132 and rotor shafts 114 may be oriented vertically. However, it may be appreciated the driver shaft 132 and the rotor shafts 114 may be oriented horizontally or at any desired angle. Further, the rotational movement multiplier may include multiple platforms and may also include extended rotor shafts 114 connected to a number of additional rotor discs 112.

Figure 8:
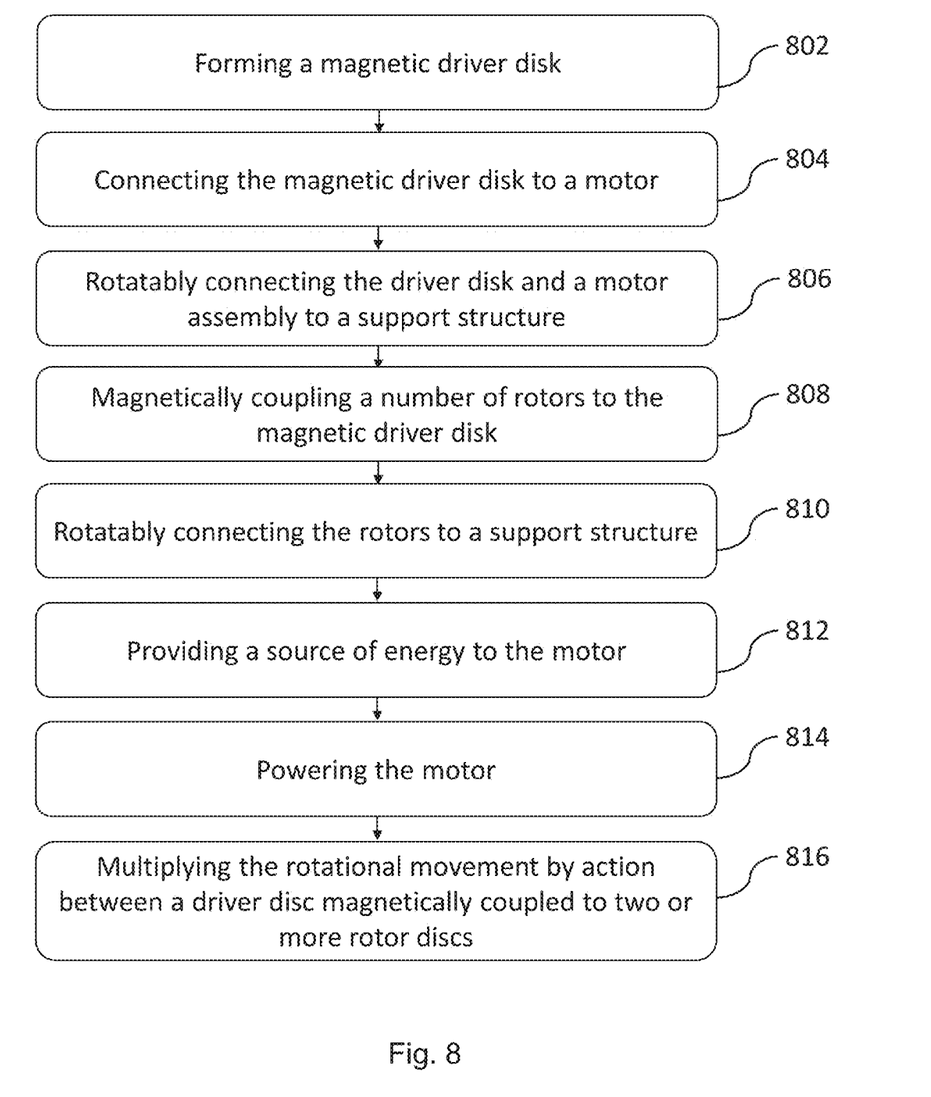
FIG. 8 is a diagram showing an exemplary embodiment of a method of multiplying rotational movement.

Another exemplary embodiment providing a method of multiplying rotational movement may be shown in FIG. 8. A magnetic driver disc may be formed and utilized as described in 802. Next, a shaft may be used to connect the magnetic driver disc to a motor in 804 before rotatably connecting the driver disc and motor assembly to a support structure in 806. Then, a number of rotor discs may be magnetically coupled to the magnetic driver disc in 808 and may rotatably connect the rotors to the support structure in 810. Finally, a source of energy power in 812 may be provided to power the motor in 814, and may thus multiply the rotational movement by action between the driver disc magnetically coupled to two or more rotor discs in 816.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A rotational movement multiplier apparatus comprising:
a support structure;
a lower platform rigidly connected to the support structure;
an upper platform rigidly connected to the support structure;
a support platform rigidly connected to the support structure;
one or more bushings connected to the lower end of the support structure;
a driver disc rigidly connected to a driver shaft;
a coupler connecting the driver shaft to a motor;
two or more rotor discs each rigidly connected to a corresponding rotor shaft rotatably connected to the support structure;
a first plurality of magnets rigidly connected to the driver disc and a second plurality of magnets rigidly connected to the rotor disc, wherein the driver disc is proximal to the two or more rotor discs and there is a predetermined distance between the driver disc and at least two of the rotor discs, and wherein the first plurality of magnets and the second plurality of magnets are neodymium magnets; and
a third plurality of magnets rigidly connected to the lower end of the two or more rotor shafts magnetically levitating on a fourth plurality of magnets rigidly connected to the support platform
wherein each driver disc and the two or more rotor discs comprise a plurality of cavities on a perimeter of the discs, and the plurality of cavities house a plurality of magnets.

2. The apparatus of claim 1, wherein the driver shaft is formed of stainless steel has a length of about 35.0 cm and a diameter of about 2.54 cm.

3. The apparatus of claim 1, wherein the two or more rotor discs are magnetically coupled to the driver disc.

4. The apparatus of claim 1, wherein the lower platform and the upper platform have a thickness of about 19.0 mm, with each side measuring about 51.0 cm in length.

5. The apparatus of claim 1, wherein the bushing is made of at least one of synthetic rubber and polyurethane.

6. The apparatus of claim 1, wherein the driver disc and the two or more rotor disc have a diameter of about 20 cm and a thickness of about 3.77 cm.

7. The apparatus of claim 1, wherein the driver disc is situated in the center of the lower platform and the upper platform, and four rotor discs are uniform in size, are proximate to the driver disc and are evenly spaced on the perimeter of the driver disc.

8. The apparatus of claim 1, wherein the lower platform and the upper platform each have a square shapes, are made of aluminum, and are separated from each other by a distance of about 15 cm.

9. The apparatus of claim 1, wherein each driver disc and the two or more rotor discs are connected to a corresponding shafts by spline groove and a plurality of c-clips are inserted in circumference grooves.

10. The apparatus of claim 1, wherein each of the each driver disc and the two or more rotor discs comprise twenty cavities, each cavity housing one magnet and at least one washer.

11. The apparatus of claim 10, wherein the plurality of washers and magnets are coupled to the driver disc, or to two or more rotor disc, with a screw.

12. The apparatus of claim 10, wherein the magnets are placed in an alternating polarity pattern on the driver disc and on each of the two or more rotor discs.

13. The apparatus of claim 10, wherein the magnets have a diameter of about 2.54 cm and a height of about 1.27 cm.

14. A system for multiplying rotational movement comprising:
a motor;
an external power source; and
a rotational movement multiplier comprising:
a support structure;
a lower platform rigidly connected to the support structure;

an upper platform rigidly connected to the support structure;

a support platform rigidly connected to the support structure;

one or more bushings connected to the lower end of the support structure;

a driver disc rigidly connected to a driver shaft;

a coupler connecting the driver shaft to the motor;

two or more rotor discs each rigidly connected to a corresponding rotor shaft rotatably connected to the support structure; and a first plurality of magnets rigidly connected to the driver disc and a second plurality of magnets rigidly connected to the rotor disc, wherein the driver disc is proximal to the two or more rotor discs and the distance between the driver disc and at least two of the rotor discs is about 23 mm and wherein each driver disc and the two or more rotor discs comprise a plurality of cavities on a perimeter of the discs, and the plurality of cavities house a plurality of magnets.

15. The system of claim 14, wherein the motor is rigidly coupled to the rotational movement multiplier apparatus and transmits a rotational movement to the rotational movement multiplier.

16. The system of claim 14, wherein the motor is powered by the external power source.

17. The system of claim 14, wherein the lower end of the two or more rotor shafts are rigidly connected to a third plurality of magnets and are magnetically levitating on a fourth plurality of magnets rigidly connected to the support platform.

* * * * *